(12) United States Patent
Gomez Lucia

(10) Patent No.: US 10,277,752 B2
(45) Date of Patent: Apr. 30, 2019

(54) DETERMINING COORDINATES OF SCAN BARS

(71) Applicant: HEWLETT-PACKARD DEVELOPMENT COMPANY, L.P., Houston, TX (US)

(72) Inventor: Jorge Miguel Gomez Lucia, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 15/520,286

(22) PCT Filed: Oct. 30, 2014

(86) PCT No.: PCT/US2014/063150
§ 371 (c)(1),
(2) Date: Apr. 19, 2017

(87) PCT Pub. No.: WO2016/068937
PCT Pub. Date: May 6, 2016

(65) Prior Publication Data
US 2017/0318163 A1    Nov. 2, 2017

(51) Int. Cl.
*H04N 1/00* (2006.01)
*H04N 1/04* (2006.01)
(Continued)

(52) U.S. Cl.
CPC ......... *H04N 1/00037* (2013.01); *H04N 1/028* (2013.01); *H04N 1/04* (2013.01);
(Continued)

(58) Field of Classification Search
None
See application file for complete search history.

(56) References Cited

U.S. PATENT DOCUMENTS 4,847,641 A * 7/1989 Tung ............... G06K 15/02
347/131
5,005,139 A * 4/1991 Tung ............... G06K 15/02
358/1.1
(Continued)

FOREIGN PATENT DOCUMENTS

CN     102263877     11/2011
EP     0849932       6/1998
(Continued)

OTHER PUBLICATIONS

Smith, E., Estimating Scanning Characteristics From Corners in Bilevel Images, Electrical and Computer Engineering Department, Boise State University, Boise, Idaho 83725 USA Jan. 24, 2001.

*Primary Examiner* — Anh-Vinh T Nguyen
(74) *Attorney, Agent, or Firm* — Dierker & Kavanaugh PC

(57) ABSTRACT

In one example, a document scanner having a document-receiving platen. The platen includes a plurality of alignment patterns disposed on the platen at known positions in a coordinate system. The scanner includes overlapping staggered scan bars disposed adjacent the platen, each scan bar fixed at a position to image a one-dimensional slice of a corresponding one of the alignment patterns. The scanner further includes a controller to determine, from the imaged slice, X and Y coordinates of each corresponding scan bar within the coordinate system.

15 Claims, 7 Drawing Sheets

(51) Int. Cl.
*H04N 1/028* (2006.01)
*H04N 1/191* (2006.01)
*H04N 1/387* (2006.01)

(52) U.S. Cl.
CPC ........... *H04N 1/191* (2013.01); *H04N 1/1916* (2013.01); *H04N 1/3876* (2013.01); *H04N 2201/0081* (2013.01)

(56) References Cited

U.S. PATENT DOCUMENTS

| | | | | |
|---|---|---|---|---|
| 5,317,407 A * | 5/1994 | Michon | ................ | H04N 5/363 348/306 |
| 5,813,771 A | 9/1998 | Ur et al. | | |
| 5,870,112 A * | 2/1999 | Kang | ................ | G06K 15/107 347/12 |
| 6,325,505 B1 * | 12/2001 | Walker | ................ | B41J 2/125 347/105 |
| 6,356,358 B1 * | 3/2002 | Kakutani | ................ | B41J 2/01 347/37 |
| 6,470,099 B1 | 10/2002 | Dowdy et al. | | |
| 6,540,315 B1 * | 4/2003 | Nystrom | ................ | B41J 11/42 347/12 |
| 6,585,341 B1 * | 7/2003 | Walker | ................ | B41J 2/125 250/559.44 |
| 6,606,421 B1 * | 8/2003 | Shaked | ................ | G06K 5/00 382/275 |
| 6,623,096 B1 * | 9/2003 | Castano | ................ | B41J 2/2135 347/19 |
| 7,431,417 B2 * | 10/2008 | Rodenas | ................ | B41J 29/393 347/19 |
| 7,814,444 B2 * | 10/2010 | Wohl | ................ | G06F 17/505 716/100 |
| 7,856,331 B2 | 12/2010 | Thompson | | |
| 7,988,252 B2 * | 8/2011 | Risson | ................ | B41J 29/393 347/19 |
| 8,594,383 B2 * | 11/2013 | Nachlieli | ................ | G06T 7/0006 382/112 |
| 8,666,286 B2 | 3/2014 | Shingai | | |
| 8,960,845 B2 * | 2/2015 | Benedicto | ................ | B41J 2/175 347/14 |
| 2002/0028011 A1 | 3/2002 | Yasuda | | |
| 2002/0135629 A1 * | 9/2002 | Sarmast | ................ | B41J 2/2135 347/19 |
| 2003/0048326 A1 * | 3/2003 | Yamasaki | ................ | B41J 2/15 347/41 |
| 2007/0050749 A1 * | 3/2007 | Ye | ................ | G03F 1/44 430/30 |
| 2007/0291291 A1 * | 12/2007 | Vilar | ................ | H04N 1/3878 358/1.9 |
| 2009/0027737 A1 | 1/2009 | Ingendoh | | |
| 2009/0033957 A1 | 2/2009 | Hardy | | |
| 2009/0180156 A1 | 7/2009 | Yoshimaru | | |
| 2009/0315932 A1 * | 12/2009 | Dimitrijevic | ................ | G06K 15/107 347/12 |
| 2010/0218061 A1 * | 8/2010 | Sinanoglu | ................ | G01R 31/318547 714/731 |
| 2011/0085216 A1 | 4/2011 | Noh | | |
| 2011/0216178 A1 | 9/2011 | Carpenter | | |
| 2012/0019875 A1 | 1/2012 | Hoover et al. | | |
| 2012/0086747 A1 * | 4/2012 | Terada | ................ | B41J 19/145 347/9 |
| 2012/0098187 A1 | 4/2012 | Harashima | | |
| 2013/0016404 A1 | 1/2013 | Yap et al. | | |
| 2013/0163055 A1 * | 6/2013 | Herloski | ................ | G03G 15/5062 358/474 |
| 2014/0268189 A1 | 9/2014 | Hunter | | |
| 2017/0225499 A1 * | 8/2017 | Quintero Ruiz | ................ | B41J 29/393 |
| 2018/0213092 A1 * | 7/2018 | Berfanger | ................ | H04N 1/00087 |

FOREIGN PATENT DOCUMENTS

| | | |
|---|---|---|
| EP | 1009159 A2 | 6/2000 |
| JP | 2006-086995 | 3/2006 |
| JP | 2009-194434 | 8/2009 |
| JP | 2010-220092 | 9/2010 |
| JP | 2012-048593 | 3/2012 |

* cited by examiner

```
                            ┌───┐
                            │ A │
                            └─┬─┘
                              │
  ┌───────────────────────────▼──────────────────────────────┐
  │  DETERMINE AN X COORDINATE FOR EACH SCANBAR FROM A       │
  │  POSITION WITHIN THE CORRESPONDING IMAGE OF A 1ST        │
  │  FEATURE OF THE CORRESPONDING SIGNATURE 514              │
  │                                                          │
  │  ┌────────────────────────────────────────────────────┐  │
  │  │ IDENTIFY EDGES IN THE SIGNATURE WHICH CORRESPOND TO│  │
  │  │ THE 1ST FEATURE 516                                │  │
  │  └────────────────────────────────────────────────────┘  │
  │                                                          │
  │  ┌────────────────────────────────────────────────────┐  │
  │  │ DETERMINE A POSITION WITHIN THE ONE-DIMENSIONAL    │  │
  │  │ IMAGE OF EACH IDENTIFIED EDGE 518                  │  │
  │  └────────────────────────────────────────────────────┘  │
  │                                                          │
  │  ┌────────────────────────────────────────────────────┐  │
  │  │ COMPUTE THE X COORDINATE FROM THE DETERMINED       │  │
  │  │ LOCATIONS 520                                      │  │
  │  └────────────────────────────────────────────────────┘  │
  └───────────────────────────┬──────────────────────────────┘
                              │
  ┌───────────────────────────▼──────────────────────────────┐
  │  DETERMINE A Y COORDINATE FOR EACH SCANBAR FROM A        │
  │  WIDTH WITHIN THE CORRESPONDING IMAGE OF A 2ND FEATURE   │
  │  OF THE CORRESPONDING SIGNATURE 522                      │
  │                                                          │
  │  ┌────────────────────────────────────────────────────┐  │
  │  │ IDENTIFY EDGES IN THE SIGNATURE WHICH CORRESPOND TO│  │
  │  │ THE 2ND FEATURE 524                                │  │
  │  └────────────────────────────────────────────────────┘  │
  │                                                          │
  │  ┌────────────────────────────────────────────────────┐  │
  │  │ DETERMINE A SPACING WITHIN THE ONE-DIMENSIONAL IMAGE│ │
  │  │ BETWEEN THE IDENTIFIED EDGE 526                    │  │
  │  └────────────────────────────────────────────────────┘  │
  │                                                          │
  │  ┌────────────────────────────────────────────────────┐  │
  │  │ COMPUTE THE Y COORDINATE FROM THE DETERMINED       │  │
  │  │ SPACING 528                                        │  │
  │  └────────────────────────────────────────────────────┘  │
  └───────────────────────────┬──────────────────────────────┘
                              │
                          ( END )
```

FIG. 5B

DETERMINING COORDINATES OF SCAN BARS

BACKGROUND

Optical image scanners are commonly used to create digital images, or other digital representations, of physical objects. One type of object frequently scanned is documents. Certain documents, such as for example blueprints, posters, or the like, may be quite large, spanning as much as 50 inches along the smaller edge. Large-format scanners may be used to image such documents. However, individual scan bars may be much smaller than 50 inches in length, so that multiple scan bars may be utilized to image large documents. However, it is a challenge to consistently obtain high quality images using multiple scan bars.

BRIEF DESCRIPTION OF THE DRAWINGS

FIGS. 5A-5B are a flowchart in accordance with an example of the present disclosure of a method of aligning overlapping staggered fixed-position scan bars.

DETAILED DESCRIPTION

Figure 1:
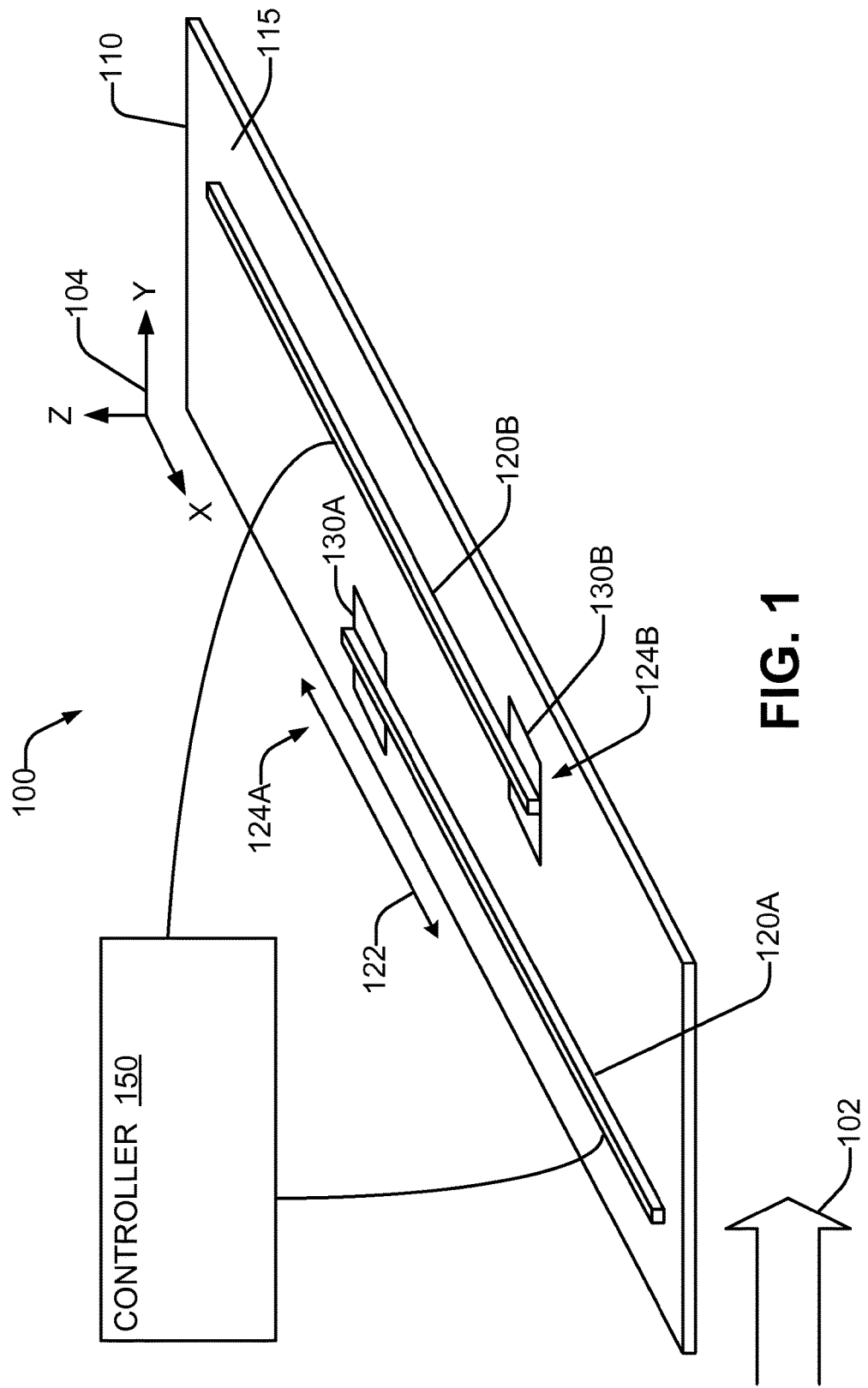
FIG. 1 is a schematic representation of a document scanner having overlapping staggered fixed-position scan bars, in accordance with an example of the present disclosure.

Some large-format scanners use multiple scan bars to scan documents wider than the width of a single scan bar. The document may be sheet-fed into the scanner and transported past a fixed-position array of scan bars. For example, in order to scan a document that is 50 inches wide using scan bars which are 17 inches wide, three or more such scan bars arranged in a staggered, overlapping fashion may be used. As the document is transported past the array, each scan bar sequentially generates a series of one-dimensional image scans of the region of the document that is adjacent to the viewing field of the scan bar at that time. When the one-dimensional images from all of the scan bars have been obtained, these images are stitched together to produce a composite image of the entire document. The term "fixed-position," as defined herein and in the appended claims, may be broadly understood to mean that the position of the scan bar does not change during scanning of a document.

If the precise position within the scanner of each scan bar is not known, it is difficult for the stitching process to align the images captured by each scan bar properly in order to produce a highly accurate image. In one example, the images are captured at a resolution in the feed direction of 600 pixels per inch, and the imaging elements of a scan bar may be disposed at a resolution of 600 pixels per inch along its width. As a result, even a small error in the presumed scan bar location within the scanner can cause the one-dimensional images captured with some scan bars to be stitched at the incorrect position relative to other scan bars, and visible discontinuities or other artifacts may be seen in the composite image.

To remedy this, some scanners use a master alignment plot to determine the position in the scanner of each scan bar. This is a printed document that is supplied to the scanner in an alignment mode and scanned in a special alignment mode. The two-dimensional images captured by the scanner can then be compared with the known positions of features on the master plot to determine the positioning within the scanner of each scan bar.

However, this presents several disadvantages. First, the alignment is performed with the intervention of the user; thus, it cannot be done automatically. In many cases, it is done at the time of the user's choosing. Furthermore, after the scan bars have been aligned, their position within the scanner, and/or relative of a platen of the scanner, may change. In some cases, opening or closing the scanner may cause such a change. In other cases, the positions may change as a result of thermal changes inside the scanner during operation that cause expansion or contraction of scanner components. In still other cases, the positions may change as a result of the scanner being transported from one location to another and, for example, being bumped or jostled in the process. The scan bar positions are also likely to change if one of the scan bars in the assembly is serviced or replaced. The user may not realize the need for re-alignment in some or all of these cases until the image quality becomes so degraded that it cannot help but be noticed.

One concept of the present disclosure is to provide a technique for automatically aligning overlapping scan bars without user interaction and without scanning a medium containing a master plot. When implemented with a computer, the result is a significant enhancement to the computer's function, because the computer can in many cases determine when such an alignment should be performed, rather than relying on a user to recognize this and initiate an alignment.

Referring now to the drawings, there is illustrated an example of a document scanner which automatically aligns overlapping scan bars without user interaction, and without scanning a medium containing a master plot. A platen of the scanner has alignment patterns at known positions in a coordinate system. The alignment patterns are imageable by the scan bars. From a one-dimensional image portion (or "slice") of each alignment pattern captured by a corresponding scan bar positioned adjacent to the pattern, a controller determines X and Y coordinates of each scan bar within the coordinate system. These X and Y coordinates can then be used to properly stitch together images captured by the scan bars of documents that are wider in width than any individual scan bar.

Considering now one example of a document scanner, and with reference to FIG. 1, a scanner 100 includes a platen 110. The platen 110 may receive a document fed through the scanner in direction 102 (substantially the Y direction of coordinate system 104). The document may be larger in the X direction than the span of an individual scan bar 120. Two scan bars 120A, 120B (collectively 120) are disposed adjacent an imageable surface 115 of the platen 110 located substantially in the X-Y plane of the coordinate system 104.

While the imageable surface 115 is illustrated as being on the side of the platen 110 nearest the scan bars 120, in another example the imageable surface 115 may be on the opposite side of a transparent platen 110. In one example, the scan bars 120 may be disposed in contact with the imageable surface 115. In another example, the scan bars 120 may be spaced above the imageable surface 115 by a distance along the Z axis. The scan bars 120 are maintained in a fixed position by other features (not shown) of the scanner 100 such as, in one example, a structural member of the scanner chassis or cover. Each scan bar 120 has a plurality of individual image sensing elements (not shown), each of which generates a pixel of the scanned image. A scan bar 120 may use CCD (charge-coupled device) scanning technology, CIS (contact image sensor) technology, or other technologies. The image sensing elements of a scan bar 120 are arranged substantially linearly in a one-dimensional arrangement parallel to the X direction, and each sensing element has a corresponding field of view in the −Z direction (towards the platen 110). At a given time, each scan bar 120 images a slice of the document, and/or a portion of the platen 110, that is positioned within the field of view of the elements of the scan bar 120. The captured image is a linear array of pixels, each indicative of a same Y coordinate and a different X coordinate. As the document is fed through the scanner 100, a time sequence of slices are captured by the scan bars 120, which can be converted to a two-dimensional image of the pixels. One use of the platen 110 is to maintain the document in a substantially flat orientation parallel to the imageable surface 115 at least within the field of view of the image sensing elements. Other mechanical components such as, for example, rollers (not shown) assist with feeding the document and maintaining its flatness. In one example, the document is fed between the scan bars 120 and the platen 110. In another example, the platen 110 is transparent and is positioned between the scan bars 120 and the document, such that the document is imaged through the platen 110. The platen 110 may be made of a dimensionally-stable, rigid material.

The scan bars 120A, 120B are disposed in an overlapping, staggered arrangement. With reference to the coordinate system 104, the two scan bars 120A, 120B overlap at a span 122 along the X axis, but are staggered along the Y axis.

Two alignment patterns 130A, 130B (collectively 130) are disposed on the platen 110. The alignment patterns 130 are imaged by the scan bars 120 when no document is present in order to obtain position information about the scan bars 120 that can be used to properly form the image of a document that is subsequently scanned. In one example, an alignment pattern 130 is etched on the platen 110. In one example, an alignment pattern 130 is attached to a medium and affixed to the platen 110. Each alignment pattern 130 is disposed on the platen 110 relative to a scan bar 120 such that the pattern 130 is imageable by an end portion 124 of that scan bar 120. The end portion 124 may be used for imaging the alignment pattern 130 but not the document. Where the platen 110 is disposed between the scan bars 120 and the document, during document scanning the portion of a document that is blocked from the view of one scan bar 120 by the corresponding alignment pattern 130 is instead imaged by the other scan bar 120 because of the scan bar overlap 122.

A controller 150 is coupled to the scan bars 120. The controller 150 may trigger or instruct the capture of a one-dimensional image by each scan bar 120. The controller may do so both during alignment (to capture a slice of the alignment pattern 130) and during document scanning (to capture a slice of the document). During scanning of a document, the controller 150 does so in synchronization with the feeding of the document through the scanner 100 in order to capture a sequence of such images from which a two-dimensional image of the document may then be constructed.

Figure 2:
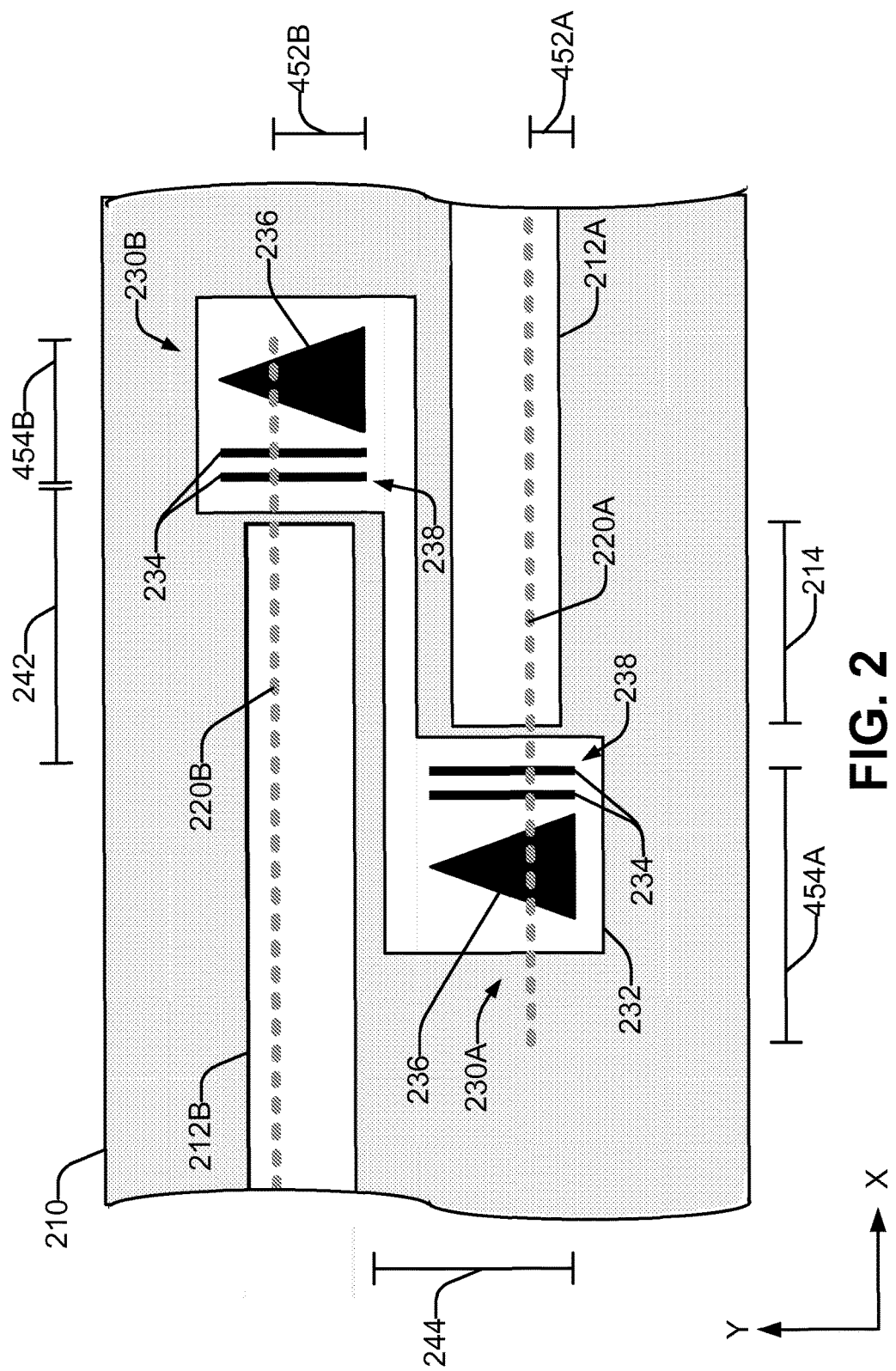
FIG. 2 is a schematic representation of a portion of a platen having alignment patterns and usable with the document scanner of FIG. 1, in accordance with an example of the present disclosure.

Considering now an example of a platen having alignment patterns, and with reference to FIG. 2, a portion of a platen 210 in the vicinity of the adjacent ends of two overlapped scan bars has alignment patterns 230A, 230B. Alignment pattern 230A is associated with a first scan bar, and alignment pattern 230A is associated with a second scan bar. The first scan bar is positioned in the scanner, at a given time, such that it images along dashed line 220A, and the second scan bar is positioned in the scanner such that it images along dashed line 220B. As has been discussed heretofore, while there is a nominal position in the scanner of the scan bars relative to the platen 210, the positions of the scan bars can deviate from nominal at times, and these positions may change over time and/or in response to certain events. Because FIG. 2 illustrates a portion of the platen 210, it is noted that other alignment patterns 230 may also be disposed on other portions of the platen 210, and some of these patterns may be imaged by other scan bars.

The scanner may include a document transport mechanism, such as for example rollers 212A, 212B. These rollers 212 may be disposed above the platen 210 in one example, while in another example the platen 210 is transparent and the rollers 212 may be disposed below, and viewed through, the platen 210. In one example, the portion of the scan bar that is positioned over (i.e. offset in the Z axis from) each corresponding roller 212 images the corresponding portion of the document. As a result, a range of positions 214 overlap along the X axis, and the portion of a document fed past the positions 214 are imaged by both of the scan bars corresponding to dashed lines 220A, 220B. The controller 150 subsequently selects, in the range of positions 214, pixels produced by either scan bar as appropriate when stitching together the digital representation of the scanned document.

While the positioning of the scan bars relative to the platen 210 may change, the alignment patterns 230 at the adjacent ends of two adjacent scan bars are precisely positioned on the platen 210 relative to each other. These precise positions of the two patterns 230A, 230B are predetermined, and are known to the controller of the scanner. The precise positions of the two patterns 230A, 230B relative to each other do not change over time, or in response to scanner events which could potentially change the relative position of internal components of the scanner with respect to each other, including but not limited to the opening or closing of the scanner, thermal changes inside the scanner, transportation of the scanner, jostling of the scanner, and replacement of the scan bars, among others. Where the alignment patterns 230 are formed on media which is then applied to the platen 210, the pair of alignment patterns 230 at the adjacent ends of two scan bars may be formed on a single medium 232.

Each alignment pattern 230 includes at least one feature. An alignment pattern "feature", as defined herein and in the appended claims, may be broadly understood to mean a predefined shape positioned against a contrasting background. For example, the shape may be a dark color, and the background a light color, facilitating recognition of the pattern 230 and features during scanning. Each feature is precisely positioned within the corresponding alignment pattern, and both its position and the characteristics of its shape are both known to the controller of the scanner, and do not change substantially over time or in response to scanner events.

In one example, each alignment pattern 230 includes a first feature 234 and a second feature 236. The first feature 234 may be a pair of bars parallel to the Y axis of the coordinate system 104. The second feature 236 may be an isosceles triangle with its base parallel to the X axis. As explained subsequently with reference to FIG. 3, the shapes of the features 234, 236 are selected to facilitate determination of the X and Y coordinates of the scan bars. In one example, because the two alignment patterns 230A, 230B are adjacent to opposite ends of each scan bar (e.g. pattern 230B is adjacent the largest distance in the X direction of line 220B, while pattern 230A is adjacent the smallest distance in the X direction of line 220A), the features 234, 236 are mirrored—arranged as mirror images of each other in the X direction in this example. However, in other examples, the features 234, 236 are not mirrored.

An arbitrary point 238 in each alignment pattern 230A, 230B may be chosen in order to illustrate the relative positioning of alignment patterns 230A, 230B. The arbitrary point 238, in one example, is the bottom (i.e. smallest Y value) of the edge of the first feature 234 that is furthest from the adjacent end of the scan bar. Using these arbitrary points 238, it is predetermined, and known to the scanner or controller, that the patterns 230A, 230B are spaced apart by a distance 242 in the X direction, and a distance 244 in the Y direction.

Using the same arbitrary points 238, the position of each scan bar relative to the platen 210 can be determined. For example, the imaging line 220B indicates that the corresponding scan bar is offset by a distance 452B in the Y direction from the bottom of the alignment pattern 230B. The line 220B also indicates that the end of the scan bar adjacent the pattern 230B is spaced a distance 454B in the X direction from the edge of the first feature 234 that is furthest from that end of the scan bar. As discussed subsequently with reference to FIG. 3, the distances 452, 454 are measurable to determine the X and Y coordinates of each scan bar in the scanner, and can then be used in stitching together document images from each scan bar.

Figure 3:
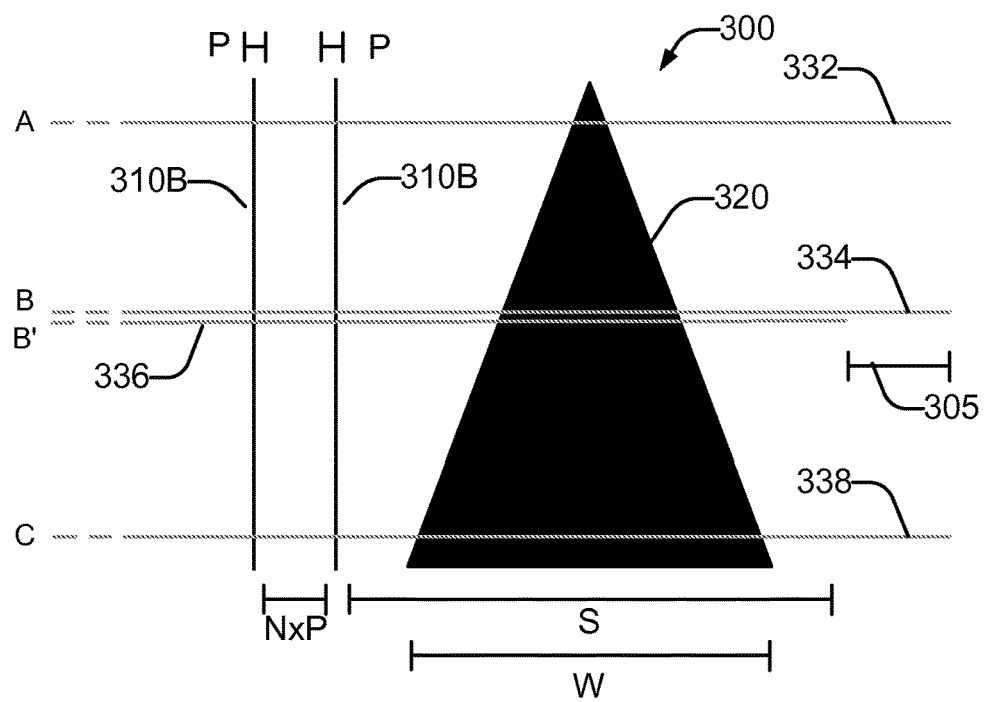
FIG. 3 is a schematic representation of various example measurements of the alignment pattern of FIG. 2 made with a fixed-position scan bar of FIG. 1, in accordance with an example of the present disclosure.
Figure 3:
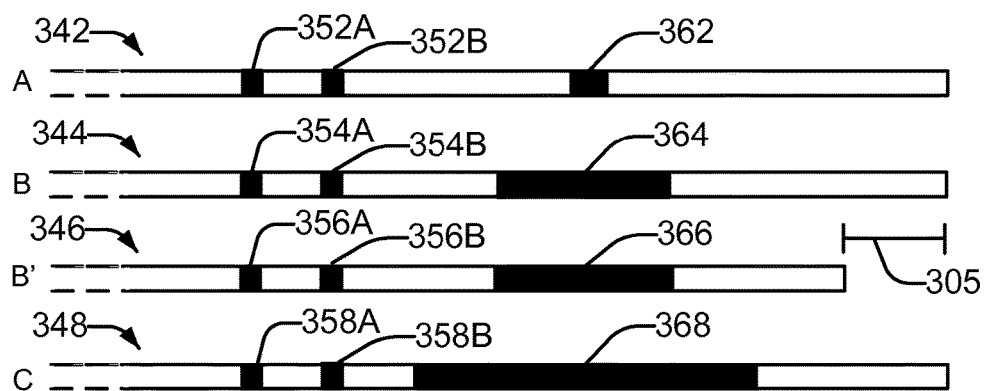
Figure 3:
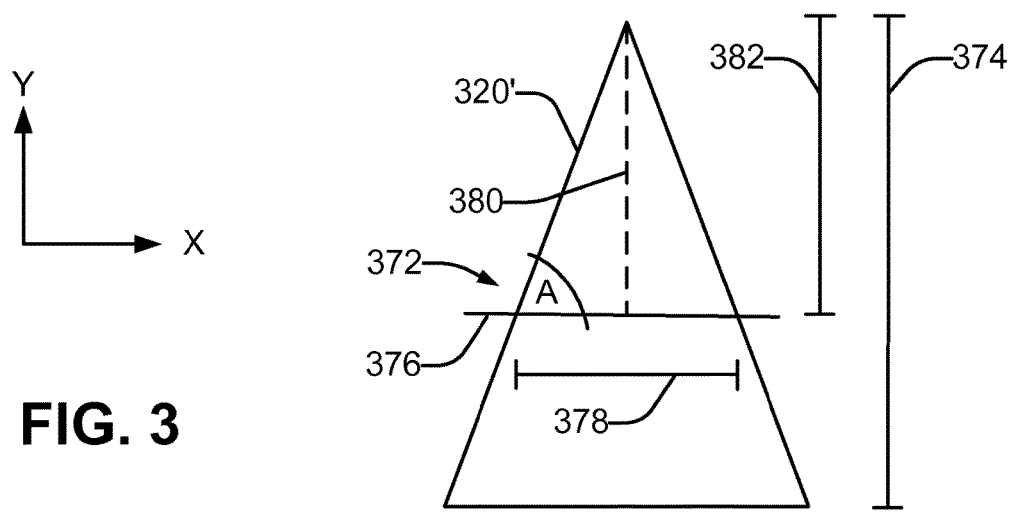

Considering now a schematic representation of various example measurements of an alignment pattern with a fixed-position scan bar, and with reference to FIG. 3, an example alignment pattern 300 includes two parallel bars 310A, 310B and a triangle 320. The bars 310 and triangle 320, in this example, are dark in color, and are set against a background that is light in color. The alignment pattern 300 is the same as or similar to alignment pattern 230B (FIG. 2). A scan bar is disposed relative to the alignment pattern 300, and makes a single scan (image measurement) of a slice of the alignment pattern 300 without either the scan bar or the alignment pattern moving.

Four example measurements illustrate this scanning of the alignment pattern 300. Lines A 332, B 334, B' 336, and C 338 illustrate the portion of the alignment pattern scanned by a scan bar that is located at four different positions relative to the alignment pattern 300. The lines 332-338 represent the right end portion of the scan bar view of the alignment pattern 300; the dashed portion of the lines indicate that they extend off the page to the left. For lines A 332, B 334, and C 338, the scan bar has the same position along the X axis but a different position along the Y axis. For line B' 336, the scan bar has a different position along the X axis but substantially the same position along the Y axis.

A schematic representation of the one-dimensional image pixel patterns captured by the scan bar for each of measurement lines 332-338 is illustrated. Image pixel pattern A 342 corresponds to line A 332; pixel pattern B 344 corresponds to line B 334; pattern B' 346 corresponds to line B' 336; and pattern C 348 corresponds to line C 338.

Each of the pixel patterns 342-348 have dark regions which correspond to a slice of the bars 310A, 310B and the triangle 320.

Dark regions 352A-358A corresponds to a slice of bar 310A, and dark regions 352B-358B corresponds to a slice of bar 310B. Dark regions 362-368 correspond to a slice of triangle 320.

After a pixel pattern 342-348 is imaged by the scan bar, a signature which corresponds to the alignment pattern is searched for in that pixel pattern. In an example usable with alignment pattern 300, this involves first searching for two adjacent dark regions of substantially equal width separated by a light region whose width has a predefined relationship to the width of the dark regions. For example, if a dark region is P adjacent pixel positions wide, then the light region between them may be N times P adjacent pixel positions wide in order to represent a signature of the alignment pattern, where the value of N is predetermined. Next, a single dark region is searched for within a pixel span S adjacent to the two dark regions. This single dark region corresponds to the triangle 320, and therefore its width is dependent upon the position of the scan bar along the Y axis. Regardless of the width of this single dark region (up to width W), the remainder of pixel span S should be light regions. If these conditions are all met, then it is concluded that a signature has been found in the pixel pattern.

Each pixel pattern 342-348 illustrates such a signature. The dark regions 352A-358A and 352B-358B are all of width P and all are spaced apart by a light region of size M times P. They also have an adjacent single dark region 362-368 of varying size.

In one example, more specifically, the signature is located within the pixel pattern by first applying to the image a Gaussian filter and its first and second derivatives in order to locate the position of all edges in the pixel pattern indicative of a change in luminance of the signals from the scan bar. Due to signal noise and other measurement factors, there may be a large number of edges in the pattern, many of which represent a minor variation in luminance, not a transition between a light region and a dark region. Therefore, the edges which exceed a threshold variance in luminance are identified as those edges associated with a transition between a light region and a dark region. It is these edges that define the span, and the position within the pixel pattern, of the light and dark regions of the signature.

The X coordinate of a scan bar is determined from the location of the signature within the pixel pattern 342-348 imaged by that scan bar. In one example, the X coordinate is determined in whole or in part from the position within the pixel pattern of one or both of the vertical bars 310A-B. Consider the positioning of lines B 334 and B' 336. Although slightly separated in FIG. 3 for clarity of illustration, assume that they have substantially the same position along the Y axis. However, the scan bar associated with line B' 336 is offset in the X direction from the scan bar associated with line B 334 by a distance D 305. As a result, the pixel patterns B 344 and B' 346 have an identical signature (the width of the single dark regions 364, 366 is the same because the lines B 334 and B'336 have the same Y position). However, this signature has a different position in the two pixel patterns 344, 346. The signatures are offset from each other by the number of pixel positions which correspond to the distance D 305. Because the imaging elements of the scan bar are disposed at a known spacing in the X direction (e.g. spacing 242, FIG. 2), the X coordinate of the scan bar can be calculated from the pixel position of the signature within the pixel pattern. The X coordinates of two adjacent scan bars, in turn, can be used to determine which imaging elements in the two scan bars can image the same X position of a scanned document. To facilitate obtaining the X coordinate of a particular scan bar, in one example each scan bar may have an identifying number which indicates the position of that scan bar within the array of scan bars in the scanner, and each scan bar can be referred to a zero pixel of the entire array based on the identifying number.

In one example, more specifically, the X coordinate is determined from the location within the pixel pattern of at least one edge of the two dark regions 310A-B. In some examples, the X coordinate of the scan bar may be determined as the average of the positions within the pixel pattern of the four edges of the two vertical bars 310A-B. Because the corresponding average edge position on the physical alignment patterns for the scan bar and its adjacent scan bar are known, the X coordinate can be used to align the scan bar to its adjacent overlapping staggered scan bar.

The Y coordinate of a scan bar is determined from the width of the single dark region 362-368 of the signature within the pixel pattern 342-348 imaged by that scan bar.

In one example, with reference to triangle 320', this may be accomplished through geometric principles. Triangle 320' is the same as triangle 320, but in outlined form for clarity of illustration. Triangle 320' is an isosceles triangle having angle A 372 and height 374. Line 376 illustrates the portion of the triangle 320' scanned by a scan bar at a certain position along the Y axis. The imaged pixel pattern has a single dark region of width 378. A projection 380 bisecting the upper portion of the triangle 320' forms a right angle with line 376, and intersects line 376 at its midpoint. The height 382 of the projection 380 is calculated as (width/2)×tan(A). Where the base of triangle 320' is considered the Y origin, the Y coordinate of the scan bar is the height 374 minus the height 382. Because the spacing (e.g. spacing 244, FIG. 2) between the bases of the triangles of the physical alignment patterns for the scan bar and its adjacent scan bar are known, the Y coordinate can be used to align the scan bar to its adjacent overlapping staggered scan bar.

Once the X and Y coordinates of two adjacent scan bars have been determined relative to their corresponding alignment patterns (e.g. alignment pattern 230A for the scan bar associated with line 220A, and alignment pattern 230B for the scan bar associated with line 220B, FIG. 2), these two X, Y coordinate pairs are referenced to each other based on the known, fixed offset Xp, Yp between the positions of the two alignment patterns (e.g. patterns 230A-B, FIG. 2). In this way, the position of each scan bar in the coordinate system of the platen of the scanner may be obtained.

With regard to locating the signature within a pixel pattern 342-348, it is the end portion of a scan bar that images the alignment pattern. Thus in some examples, the entire pixel pattern need not be searched for the signature, but rather that region of the pixel pattern 342-348 which encompasses the maximum variation in the X direction of the nominal position of the scan bar. In an example scan bar with 600 ppi (pixels-per-inch) resolution and an alignment pattern 300 that is 1 inch wide in the X direction, it is sufficient to search for the signature within a 2 inch (1200 pixel) span from the end of the scan bar.

Furthermore, while the alignment pattern 300 is the same as or similar to alignment pattern 230B (FIG. 2), the other alignment pattern for the adjacent overlapping scan bar (e.g. alignment pattern 230A, FIG. 2) may be a mirror image of the alignment pattern 300. In this situation, some of the processing of the image pixel patterns may proceed in the opposite direction of that described heretofore for alignment pattern 300.

Figure 4:
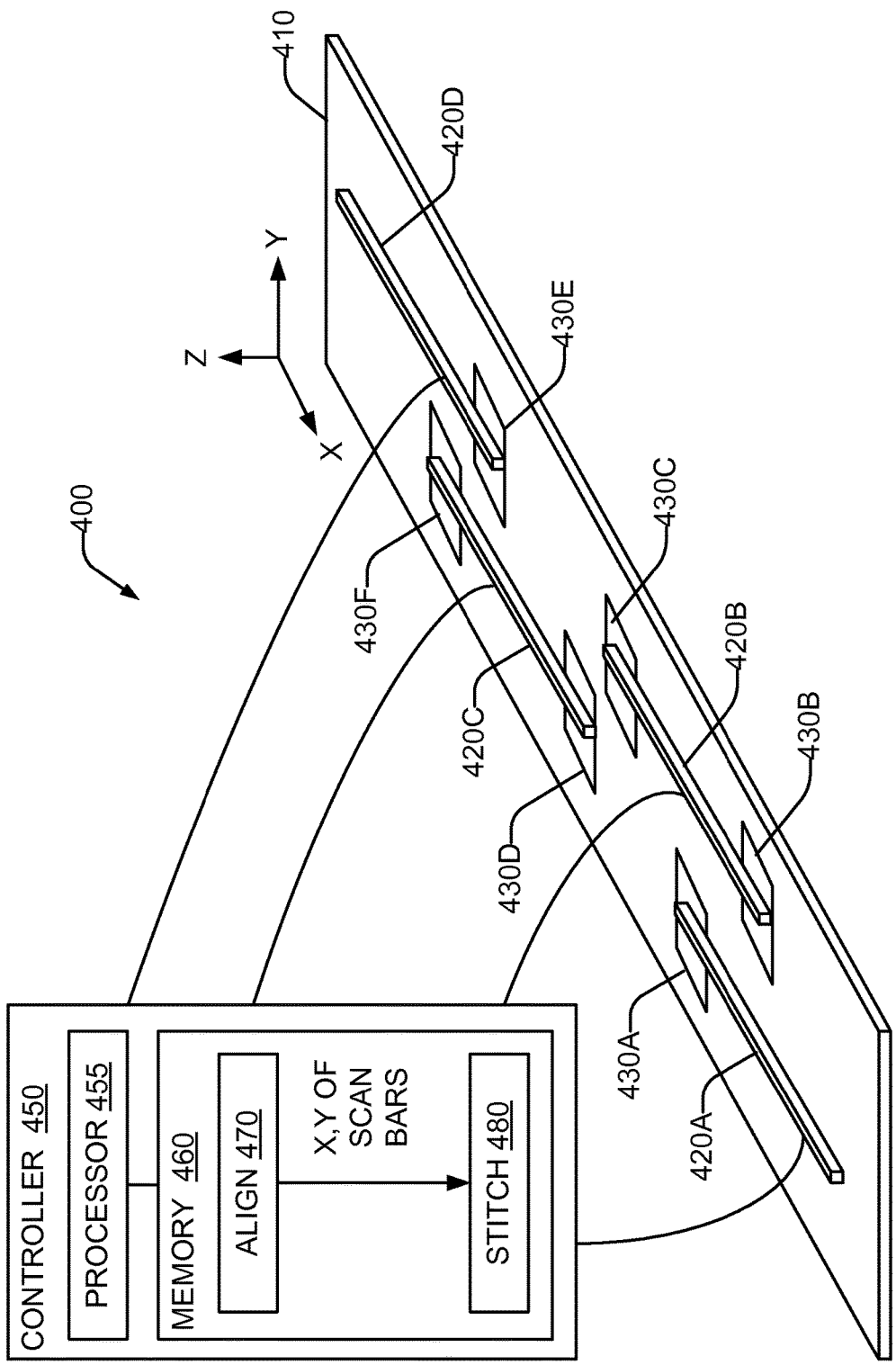
FIG. 4 is a schematic representation of another document scanner having overlapping staggered fixed-position scan bars, in accordance with an example of the present disclosure.

Considering now another example of a document scanner, and with reference to FIG. 4, a scanner 400 includes a platen 410, four scan bars 420A-D (collectively 420), six alignment patterns 430A-F (collectively 430), and a controller 450. The platen 410, an individual scan bar 420, and an individual alignment pattern 430 are similar to the platen 110, individual scan bar 120, and individual alignment pattern 130 (FIG. 1), although their dimensions may be different. Middle scan bars 420B, 420C are each disposed adjacent two alignment patterns 430, and both end portions of the scan bars 420B, 420C image the corresponding alignment pattern 430.

The scanner 400 includes a controller 450, which may be similar to the controller 150 (FIG. 1). In various examples, some or all of the controller 450 may be implemented in hardware, firmware, software, or a combination of these. In some examples where the controller 450 is implemented in whole or in part in firmware or software, the controller 450 includes a processor 455 that accesses a non-transitory computer-readable medium (memory 460) having executable programs stored thereon, and executes machine-readable instructions of the program. The memory 460 may be any tangible medium in which machine-readable instructions are stored. The memory 460 includes instructions for an alignment program or module 470, and a stitching program or module 480. The alignment module 470 images the alignment patterns for 403 and determines the X and Y coordinates for each scan bar 420 in the scanner 400. The stitching module 480 uses these X and Y coordinates to construct a two-dimensional digital representation of a document that is scanned by the scanner 400.

Figure 5A:
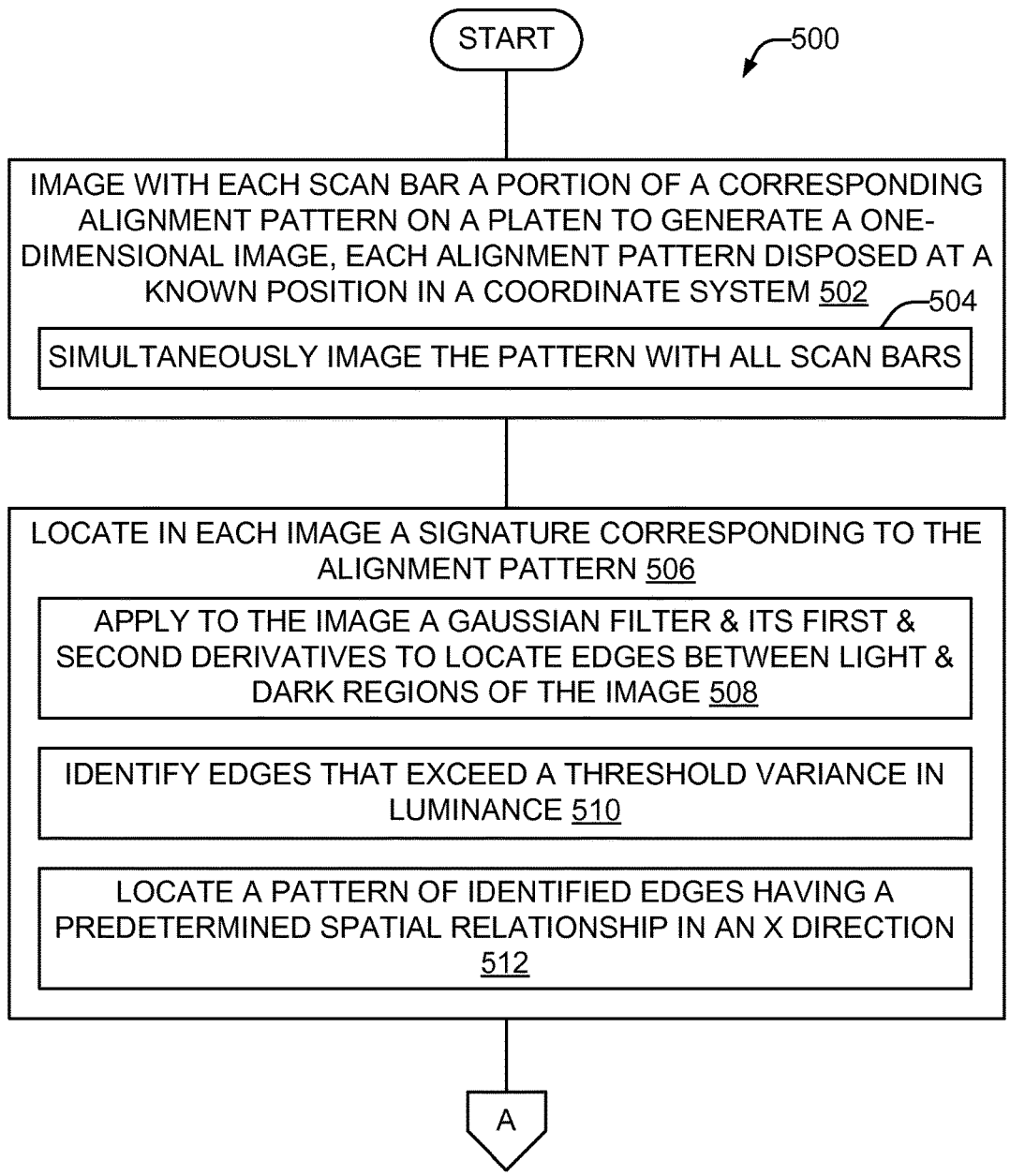

Consider now, with reference to FIGS. 5A-5B, one example method for aligning overlapping staggered scan bars that are disposed in a fixed position during scanning of a document. The flowchart of FIGS. 5A-5B may be considered as steps in a method implemented in the scanner, or in its controller. Alternatively, the flowchart of FIGS. 5A-5B may be considered as a flowchart of the scanner or its controller. The scanner may be the scanner 100, 400. A method 500 begins at 502 by imaging with each scan bar a portion (or "slice") of a corresponding alignment pattern on a platen to generate a one-dimensional image. Each alignment pattern is disposed at a known position in a coordinate system. In some examples, at 504, the pattern is simultaneously imaged with all scan bars. At 506, a signature corresponding to the alignment pattern is located in each one-dimensional image. In some examples, at 508, a Gaussian filter and its first and second derivatives are applied to the image to locate edges between light and dark regions of the image. In such examples, edges that exceed a threshold luminance variance and identified at 510, and at 512 a pattern of the identified edges that have a predetermined spatial relationship in an X direction is located. The located pattern may be as in pixel patterns 342-348 (FIG. 3).

At 514, an X coordinate for each scan bar is determined from a position or location, within the corresponding one-dimensional image, of a first feature of the corresponding signature. In some examples, at 516, edges in the signature which correspond to the first feature of the alignment pattern are identified. In such examples, a position within the one-dimensional image of each identified edge is determined at 518, and at 520 the X coordinate is computed from the determined locations.

At 522, a Y coordinate for each scan bar is determined from a width within the corresponding one-dimensional image of a second feature of the corresponding signature. In some examples, at 524, edges in the signature which correspond to the second feature of the alignment pattern are identified. In such examples, a spacing within the one-dimensional image between the identified edges is determined at 526, and at 528 the Y coordinate is computed from the determined spacing.

Figure 6:
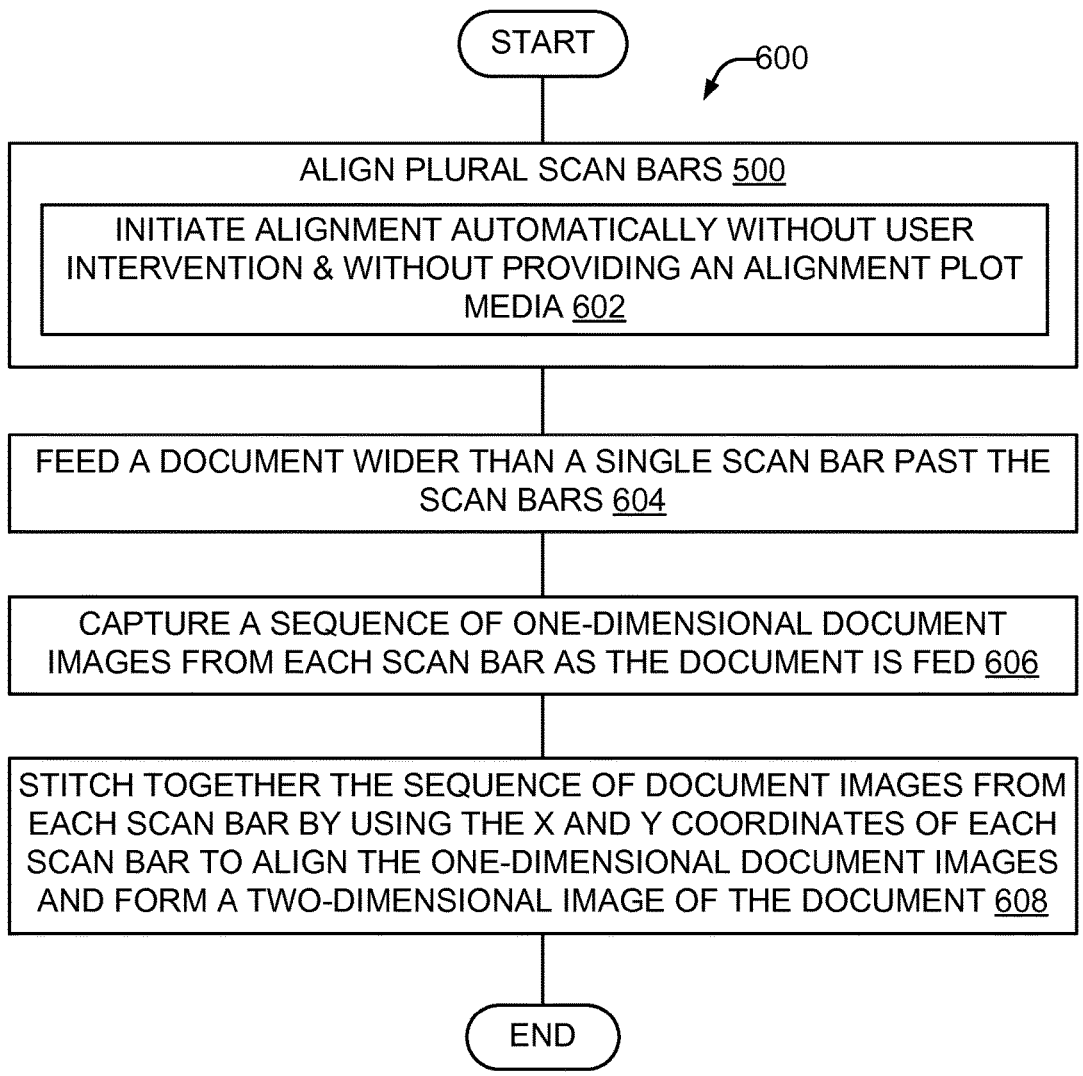
FIG. 6 is a flowchart in accordance with an example of the present disclosure of a method of using the alignment method of FIG. 5 in scanning a document wider than a single scan bar.

Consider now, with reference to FIG. 6, one example method for scanning a document wider than a single scan bar. The flowchart of FIG. 6 may be considered as steps in a method implemented in the scanner, or in its controller. Alternatively, the flowchart of FIG. 6 may be considered as a flowchart of the scanner or its controller. The scanner may be the scanner 100, 400. A method 600 begins at 500 by aligning plural scan bars. In some examples, at 602, the alignment 500 is initiated automatically by the scanner without user intervention, and without the user providing an alignment plot media to the scanner. At 604, a document wider than a single scan bar is fed past the scan bars. At 606, a sequence of one-dimensional document images is captured from each scan bar during the feeding. In some examples, the feeding may include stepping or advancing the document through the scanner by a distance in-between image captures by the scan bar. At 608, the sequence of document images from each scan bar is stitched together by using the X and Y coordinates of each scan bar to align the one-dimensional document images from the scan bars and form a two-dimensional image of the document. The stitching process determines the portions of the images captured by each scan bar that are to be used to construct the two-dimensional image, and then arranges these images appropriately in order to construct the two-dimensional image. The completed two-dimensional image appears the same as if the entire image were captured with a single scan bar as wide as the document.

In some examples, at least one block or step discussed herein are automated. In other words, apparatus, systems, and methods operate automatically. As defined herein and in the appended claims, the terms "automated" or "automatically" (and like variations thereof) shall be broadly understood to mean controlled operation of an apparatus, system, and/or process using computers and/or mechanical/electrical devices without the necessity of human intervention, observation, effort and/or decision.

Terms of orientation and relative position (such as "top," "bottom," "side,", "left", "right", and the like) are not intended to require a particular orientation of any element or assembly, and are used for convenience of illustration and description.

From the foregoing it will be appreciated that the scanner, computer-readable medium, and methods provided by the present disclosure represent a significant advance in the art. Although several specific examples have been described and illustrated, the disclosure is not limited to the specific methods, forms, or arrangements of parts so described and illustrated. Examples of the disclosure are not limited to stand-alone scanners, but include scanner subsystems that are included in other devices, such as for example a multi-function printer. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Unless otherwise specified, steps of a method claim need not be performed in the order specified. Similarly, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the disclosed examples. Further, methods or steps discussed within different figures can be added to or exchanged with methods or steps in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements. Where the claims recite "having", the term should be understood to mean "comprising".

What is claimed is:

1. A method of aligning overlapping scan bars, comprising:
    imaging with each scan bar a portion of a corresponding alignment pattern on a platen to generate a one-dimensional image, each alignment pattern disposed at a known position in a coordinate system;
    locating in each image a signature corresponding to the alignment pattern;
    determining an X coordinate for each scan bar from a position within the corresponding image of a first feature of the corresponding signature; and
    determining a Y coordinate for each scan bar from a width within the corresponding image of a second feature of the corresponding signature.

2. The method of claim 1, wherein the locating comprises:
    applying to the image a Gaussian filter and its first and second derivatives to locate edges between light and dark regions of the image;
    identifying edges that exceed a threshold luminance variance; and
    locating a pattern of the identified edges that have a predetermined spatial relationship in an X direction.

3. The method of claim 1, wherein the determining the X coordinate comprises:
    identifying edges in the signature which correspond to the first feature of the alignment pattern;
    determining a position within the one-dimensional image of each identified edge; and
    computing the X coordinate from the determined positions.

4. The method of claim 1, wherein the determining the Y coordinate comprises:
    identifying edges in the signature which correspond to the second feature of the alignment pattern;
    determining a spacing within the one-dimensional image between the identified edges; and
    computing the Y coordinate from the determined spacing.

5. The method of claim 1, wherein each alignment pattern is scanned by a portion of the corresponding scan bar which is unused during document scanning.

6. The method of claim 1, comprising:
feeding a document wider than a single scan bar past the scan bars;
capturing a sequence of one-dimensional document images from each scan bar during the feeding; and
stitching together the sequence of document images from each scan bar by using the X and Y coordinates of each scan bar to align the one-dimensional document images from the scan bars and form a two-dimensional image of the document.

7. A document scanner, comprising:
a document-receiving platen;
a plurality of alignment patterns disposed on the platen at known positions in a coordinate system;
two overlapping staggered scan bars in a scan bar array disposed adjacent the platen, each scan bar fixed at a position to image a one-dimensional slice of a corresponding one of the alignment patterns; and
a controller to determine, from the imaged slice, X and Y coordinates of each corresponding scan bar within the coordinate system.

8. The scanner of claim 7, wherein each alignment pattern comprises a first feature indicative of an X coordinate of the pattern, and a second feature indicative of a Y coordinate of the pattern.

9. The scanner of claim 7, wherein each alignment pattern comprises a linear feature disposed parallel to a Y axis of the coordinate system, and a triangular feature disposed at a predetermined position in the coordinate system relative to the linear feature.

10. The scanner of claim 9, wherein each alignment pattern further comprises a plurality of linear features, each linear feature having a predetermined width in the X direction, and each two adjacent linear features offset by a known spacing.

11. The scanner of claim 7, wherein each scan bar is disposed in the scanner substantially along an X axis of the coordinate system and is to generate a linear array of pixels each indicative of a same Y coordinate and a different X coordinate.

12. The scanner of claim 7, wherein the scan bars extend a distance in the X direction, and wherein the scanner is to scan a document larger in the X direction than the distance.

13. The scanner of claim 7, wherein each alignment pattern is positioned on the platen adjacent an end portion of each corresponding scan bar not used for document scanning.

14. A non-transitory computer-readable medium having an executable program stored thereon, wherein the program instructs a processor to:
receive from each of two overlapping scan bars a one-dimensional image of a portion of an alignment pattern disposed on a platen of a scanner;
locate in each one-dimensional image a signature corresponding to the alignment pattern portion;
determine an X coordinate for each scan bar from a position within the corresponding one-dimensional image of a first feature of the signature; and
determine a Y coordinate for each scan bar from a width within the corresponding one-dimensional image of a second feature of the signature.

15. The medium of claim 14, wherein the program instructs the processor to initiate the method automatically without user intervention and without providing an alignment plot media.

* * * * *